Figure 1:
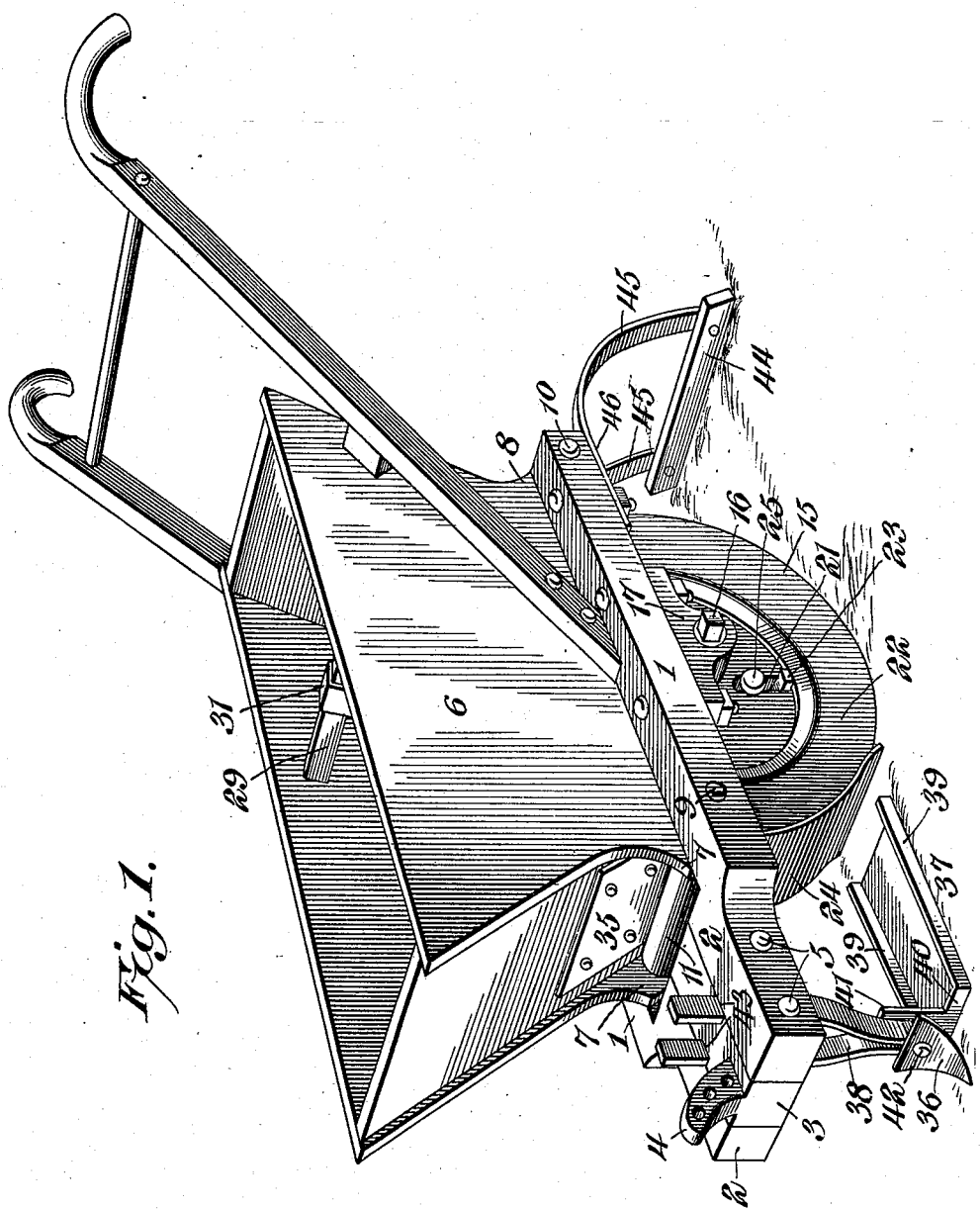

C. A. THURMOND.
COTTON PLANTER.
APPLICATION FILED NOV. 3, 1908.

924,204.

Patented June 8, 1909.
2 SHEETS—SHEET 1.

Charles A. Thurmond, Inventor,

Witnesses

By

Attorney

C. A. THURMOND.
COTTON PLANTER.
APPLICATION FILED NOV. 3, 1908.
924,204.
Patented June 8, 1909.
2 SHEETS—SHEET 2.
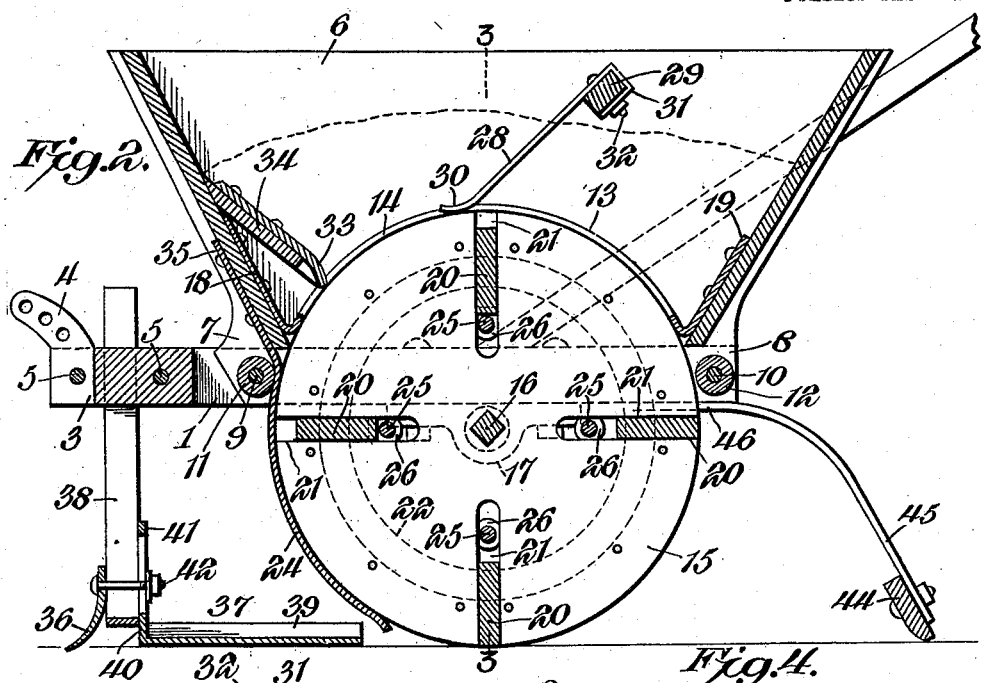
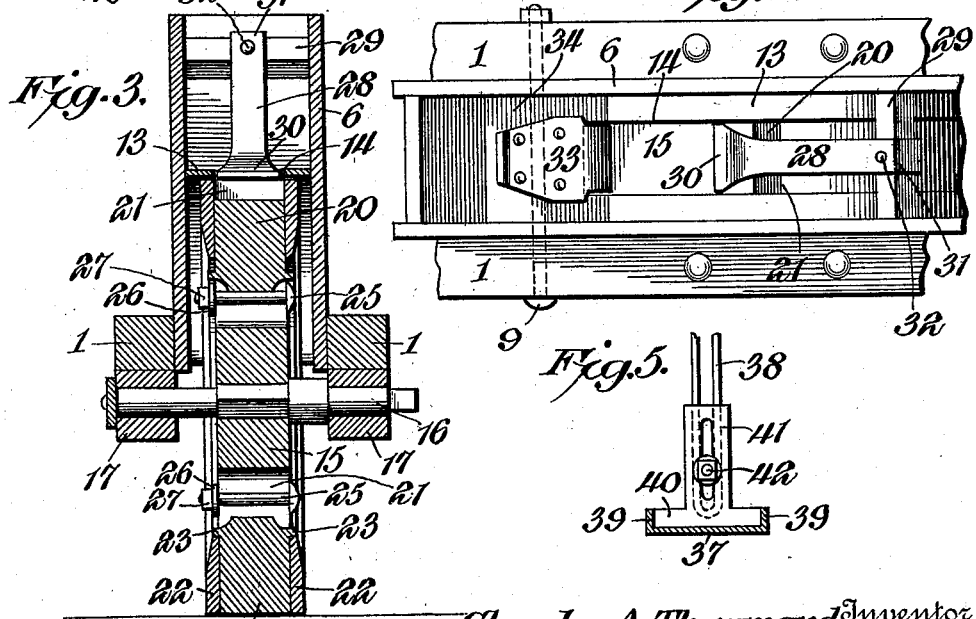
Charles A. Thurmond, Inventor,
Witnesses
Howard D. Orr.
H. J. Riley
By E. G. Siggers
Attorney

UNITED STATES PATENT OFFICE.

CHARLES ARCHIBALD THURMOND, OF PERRY, GEORGIA.

COTTON-PLANTER.

No. 924,204.     Specification of Letters Patent.     Patented June 8, 1909.

Application filed November 3, 1908. Serial No. 460,957.

*To all whom it may concern:*

Be it known that I, CHARLES A. THURMOND, a citizen of the United States, residing at Perry, in the county of Houston and State of Georgia, have invented a new and useful Cotton-Planter, of which the following is a specification.

The invention relates to improvements in cotton planters.

The object of the present invention is to improve the construction of cotton planters, and to provide a simple, inexpensive and efficient cotton planter, equipped with means for digging an ordinary furrow and smoothing the same out into a broad flat furrow and dropping the cotton seed into the same in transverse rows, so that the cotton plants may be thinned out with an ordinary plow while cultivating the cotton, thereby eliminating the labor and expense incident to the thinning out of the cotton plants with an ordinary hoe.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a cotton planter, constructed in accordance with this invention. Fig. 2 is a vertical longitudinal sectional view of the same. Fig. 3 is a transverse sectional view on the line 3—3 of Fig. 2. Fig. 4 is a plan view of a portion of a cotton planter, illustrating the construction of the seed box or hopper. Fig. 5 is a detail sectional view, illustrating the construction of the furrow broadening and leveling device.

Like numerals of reference designate corresponding parts in all the figures of the drawings.

The frame of the cotton planter comprises a pair of longitudinal side bars 1, having inwardly extended front positions 2, which are spaced apart by a block 3 of a clevis 4. The block 3 is interposed between the front portions of the side bars and is secured to the same by transverse bolts 5.

The side bars are spaced apart to receive a seed box or hopper 6, tapered downwardly and composed of parallel sides and downwardly converging front and rear walls. The side walls are provided at the front and back of the seed box or hopper with lower extensions 7 and 8, projecting beyond the front and rear end walls and secured to the side bars 1 by transverse bolts 9 and 10, spacing sleeves 11 and 12 being arranged on the bolts 9 and 10 and interposed between the extensions of the side walls of the seed box or hopper. The seed box or hopper is preferably provided with a curved sheet metal bottom 13 having a longitudinal opening 14 and arched to receive the upper portion of a rotary seed dropping drum or wheel 15, which is mounted upon a transverse shaft or axle 16. The shaft or axle 16 is journaled in suitable bearings 17, secured to the lower face of the side bars 1, as clearly illustrated in Fig. 3 of the drawings. The opening 14 extends practically the entire length of the bottom of the seed box or hopper, and the terminals 18 and 19 of the sheet metal bottom are secured to the inner faces of the inclined front and rear walls.

The rotary seed dropping drum or wheel in the present embodiment of the invention supports the cotton planter, and it is provided in its periphery with transverse grooves or seed cups and is equipped with gravity acting plungers 20 for positively ejecting or expelling the seed. The seed dropping drum or wheel, which may be made in a variety of ways, preferably consists of a disk provided at regular intervals with radial slots 21, and side plates or rings 22, secured to the disk at the outer portion thereof and having their peripheries flush with the periphery of the disk and forming end walls for the seed cups or grooves. The plungers, which are preferably constructed of metal, are movable inwardly and outwardly in the radial grooves, their outward movement being limited by laterally projecting lugs 23, operating in the inner portions of the radial slots 21 and arranged to engage the inner edges of the rings 22, which forms stops for limiting the outward movement of the plungers. As each plunger moves upwardly at the rear portion of the seed dropping drum or wheel in the operation of the cotton planter, it maintains its position at the outer portion of the radial slot until it arrives at the upper portion of the wheel, when it will move inward by gravity, exposing the outer portion of the slot, which constitutes the seed cup or groove and which is filled with cotton seed during the travel of the seed cup or groove along the curved bottom of the seed box or hopper. The cotton seed contained in the seed cup or groove is retained therein until it reaches the proper point of discharge by means of a curved guard 24, arranged at the front portion of the drum or wheel.

The size of the seed cups or grooves is varied by means of an adjustable stop 25, movable inwardly and outwardly in the inner portion of each radial groove, and adapted to limit the inward movement of the plunger when the same is at the top of the drum or wheel. The adjustable stop 25 may consist of a transverse bolt, extending through the radial slot and provided at one end with a head and equipped at the other end with a washer 26 and a nut 27, whereby the bolt is firmly engaged with the disk or body portion of the drum or wheel.

The seed box or hopper is provided with an inclined arm or blade 28, extending downwardly and forwardly from a transverse bar 29 and having its lower end 30 slightly curved. The arm or blade, which is preferably constructed of metal, has its upper end 31 angularly bent to embrace the transverse bar 29, and it is secured to the same by a bolt 32. The arm or blade 28, which is set at an angle to the periphery of the drum or wheel extends across the opening 14 of the bottom 13, and it is adapted to press the cotton seed into the seed cup or groove, while the latter is passed beneath it, thereby insuring a positive action of the seed dropping drum or wheel. The seed is prevented from adhering to the drum or wheel by means of a suitable scraper 33, preferably constructed of leather, or other flexible material and secured to an inclined support 34, arranged at the front of the seed box or hopper, as clearly illustrated in Fig. 2 of the drawings, but a brush or scraper of any other preferred construction may be employed, as will be readily understood.

The guard 24, which retains the seed within the seed cup or groove while the latter is traveling from the upper portion of the wheel or drum to the bottom thereof, is preferably constructed of sheet metal and is secured at its upper end 35 to the outer face of the front wall of the seed box or hopper. The lower end of the guard terminates short of the ground.

The narrow seed cups or grooves deposit or drop the seed in short transverse rows, which in practice will be preferably five or six inches in length, and the proper furrow is opened by means of a furrow opening blade 36 and a leveling and broadening device 37, which are mounted upon a standard 38. The furrow opening blade is tapered in the ordinary manner and the leveling device 37, which forms a broad flat furrow, preferably consists of a horizontal plate having side walls or flanges 39 and provided with a front wall 40, but the device may be made solid, or of uniform thickness if desired. The leveling device, which is of a width to correspond with the width of the rotary seed dropping drum or wheel, makes a broad flat furrow of sufficient width to receive the transverse rows of cotton seed, and it is provided at its front with an upwardly extending slotted shank 41, secured to the standard 38 by a bolt 42, which also pierces the furrow opening blade. The standard is composed of two sides connected at the bottom and having their upper portions adjustably secured to the front of the frame, the upper portions of the sides of the standard being preferably interposed between the side bars and the spacing block 3. The spacing block 3 is provided with suitable recesses 43 to receive the sides of the standard, which may be secured in its adjustment by any suitable means. The transverse bolts 5 may be employed for creating sufficient friction to clamp the sides of the standards in their adjustment. The slot of the upwardly extending shank or attaching arm of the leveling device permits the latter to be adjusted independently of the furrow opening blade. The seed are covered by means of a transversely disposed covering blade 44, located in rear of the seed dropping drum or wheel and secured to the rear ends of a pair of springs 45, arranged at an inclination and having horizontally disposed upper ends 46, secured to the lower edges of the side bars of the frame at the rear ends thereof.

The cotton seed is dropped into the broad flat furrow at regular intervals in transverse rows, which enable the cotton plants to be thinned out at each end of the transverse rows by means of an ordinary plow, while cultivating the cotton. The plow operates between the furrows in the ordinary manner, and by operating close to the ends of the transverse rows is adapted to cut down the end plants, thereby eliminating the expense and labor incident to thinning out cotton plants with a hand hoe. The seed cups or grooves may be arranged any desired distance apart to secure the proper space between the transverse rows of plants and instead of actuating the seed dropping drum or wheel through contact with the ground, it may be driven in the ordinary manner by gearing from a ground or carrying wheel, and when so operated it will of course be arranged clear of the bottom of the furrow. As this form of driving mechanism is well known in the art, illustration thereof is deemed unnecessary.

Having thus fully described my invention, what I claim as new and desire to secure by Letters Patent, is:—

1. A planter including means for forming a furrow of uniform depth, means for depositing seed in said furrow in short rows transverse to the furrow at intervals, and means for covering the seed.

2. A planter including a furrow opener, a leveling device operating in rear of the furrow opener to form a broad flat furrow, means for depositing seed in the said furrow in short rows transverse to the furrow at intervals, and means for covering the seed.

3. A planter including a furrow opener, a leveling device having a horizontal lower face and operating in rear of the furrow opener to form a broad flat furrow of uniform depth, means for depositing seed in the said furrow in short rows transverse to the furrow at intervals, and means for covering the seed.

4. A planter including a furrow opener, a leveling device consisting of a horizontal plate or body having a flat lower face and provided at the front and sides with upwardly extending flanges, said leveling device operating in rear of the furrow opener and forming a furrow of uniform depth, means for depositing the seed in the said furrow in short rows transverse to the furrow at intervals, and means for covering the seed.

5. A planter including a standard, a furrow opener secured to the standard at the front thereof, a leveling device provided with an upwardly extending arm adjustably secured to the standard at the back thereof, said leveling device operating in rear of the furrow opener to form a broad flat furrow of uniform depth, means for depositing the seed in the said furrow in short rows transverse to the furrow, and means for covering the seed.

6. A planter including means for forming a flat furrow, a rotary seed dropping drum provided at its periphery with narrow transverse seed cups, and transversely disposed gravity acting plungers arranged to expel the seed from the seed cups and deposit the said seed in the furrow in short rows transverse to the furrow at intervals, and means for covering the seed.

7. A planter including a furrow opener, means for forming a furrow of uniform depth, a rotary seed dropping drum provided at intervals with narrow transverse seed cups, transversely disposed gravity acting plungers arranged to expel the seed from the cups to deposit the seed in the furrow at intervals in short rows transverse to the furrow, and adjustable means for limiting the inward and outward movement of the plungers for varying the size of the seed cups.

8. A planter including a seed dropping drum comprising a body portion having slots extending inward from the periphery of the body portion, plates secured to the body and forming walls for the outer portions of the slots, gravity acting plungers operating in the slots and provided at their inner ends with means for engaging a side plate for limiting the outward movement of the plungers, and adjustable devices operating in the inner portions of the slots for limiting the inward movement of the plungers.

9. A planter including a seed dropping drum comprising a body portion having slots extending inwardly from the periphery thereof, side plates secured to the body portion and forming walls for the outer portions of the slots, the inner portions of the slots being exposed at the sides of the drum, gravity acting plungers operating in the slots and provided at their inner ends with laterally projecting lugs operating in the inner exposed portions of the slots and limiting the outward movement of the plungers, and means for limiting the inward movement of the plungers.

10. A planter including a seed dropping drum comprising a body portion having slots extending inwardly from the periphery of the body portion, annular side plates secured to the body portion and forming walls for the outer portions of the slots, gravity acting plungers operating in the slots and provided at their inner ends with laterally projecting lugs for engaging the plates to limit the outward movement of the plungers, and bolts extending across the inner portions of the slots and arranged to be engaged by the plungers to limit the inward movement thereof.

11. A planter including a hopper provided at its bottom with an opening, a rotary seed dropping drum having seed cups, a rearwardly inclined brush or scraper extending from the front of the hopper to the bottom of the same, a bar extending across the rear portion of the hopper, and a downwardly and forwardly inclined arm mounted on the bar and also extending to the bottom of the hopper and having its lower end arranged at the periphery of the drum for pressing the seed into the seed cups.

In testimony that I claim the foregoing as my own, I have hereto affixed my signature in the presence of two witnesses.

CHARLES ARCHIBALD THURMOND.

Witnesses:
E. B. GAMMELL,
I. T. WOODARD.